Oct. 3, 1933.  M. BRITT ET AL  1,928,877

MEAT MOLD

Filed June 20, 1931

Max Britt
and
Marinus Vanderbloot
INVENTORS

BY Roy W. Johns.
ATTORNEY

WITNESS -
Wm C. Meiser.

Patented Oct. 3, 1933

1,928,877

UNITED STATES PATENT OFFICE 1,928,877

MEAT MOLD

Max Britt and Marinus Vanderkloot, Chicago, Ill., assignors, by mesne assignments, to Industrial Patents Corporation, Chicago, Ill., a corporation of Delaware Application June 20, 1931. Serial No. 545,636

8 Claims. (Cl. 100—57)

The invention relates to improvements in meat molds, more especially to a rectangular elongated ham boiler.

The object of the present invention is to provide a meat mold having an adjustable end plate to vary the length of the mold and equipped with a spring pressed top pressing plate or cover adapted to apply initial pressure to meat to mold the same into rectangular shape and yieldingly engage the meat so that when the end plate is further adjusted to create sufficient pressure on the meat to raise, shift or level the top pressing plate or cover to vary the spring pressure of the top plate or cover on various portions of a ham, the mold will produce a more uniform rectangular shape of ham and at the same time the top spring pressed plate or cover will keep and concentrate the grain of the piece of meat in one direction.

Figure 1:
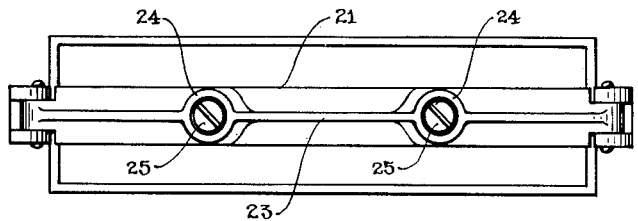
Figure 1 is a plan view of a meat mold constructed in accordance with this invention.

In the accompanying drawing, in which is illustrated the preferred embodiment of the invention, a rectangular elongated ham boiler is shown having a mold comprising a body 1 constructed of sheet metal or other suitable material and comprising vertical side walls, a horizontal bottom wall 2, and vertical end walls 3 and 4 which may be either formed integral or of separate plates or pieces welded to the side walls and bottom. The body of the mold, which constitutes a hollow block, is rounded at 5 at the juncture of the side walls and bottom wall to facilitate cleaning the mold.

The end wall 3 is provided with an opening 6 and has a threaded collar 7 mounted on it exteriorly of the end wall 3 and arranged concentric with the said opening to receive a horizontal screw 8 which is swiveled at its inner end to an adjustable end plate 9. The end plate 9, which has a cup shaped inner face 10 to engage one end of the meat, is adjustable along the mold by the said screw to vary the length of the mold. The threaded collar serves as a nut and when the screw is rotated by means of a suitable handle 11, the adjustable end plate 9 is moved backwardly or forwardly according to the direction of rotation of the screw. The handle 11 preferably consists of a tapered pin inserted in an opening in the outer end of the screw. The inner end of the screw is provided with a reduced smooth portion 12 having an annular flange 13 at the inner ends of the screw. The annular flange is mounted between spaced bearing plates 14 secured to the outer face of the adjustable end plate 9 by rivets or other suitable fastening devices and having offset inner portions 15 forming recesses to receive opposite peripheral portions of the annular flange 13 and partially embracing the same.

The offset portions of the plates 14 are annular and extend from the top to the bottom of the plates to enable the adjustable end plates to be readily inserted in the mold and engaged with and disengaged from the flange of the screw. The spaced plates 14 provide a bearing or swivel connection for the screw which is adapted to move the end plate inwardly or outwardly.

The adjustable end plate 9 is provided at its outer face with a marginal flange 16 rounded at the corners of the plate and conforming to the configuration of the interior of the mold and forming broad bearing surfaces to slide on the walls of the mold and also on the lower face of an upper horizontal pressing plate 17. The flange 16 extends across the adjustable end plate at the bottom thereof and vertically at the side edges thereof and inwardly at the top of the adjustable plate and terminates at the top at spaced points to provide an opening in the flange at the top of the end plate.

The top pressing plate which constitutes a cover for the body of the mold, forms a solid block to cooperate in the molding of the meat with the hollow block formed by the body of the mold. This top pressing plate or member consists of a flat plate having a cup shaped lower face 18, and it is provided at its upper face with short vertical tubes 19 adapted to center and retain in position the lower portions of vertically disposed coil springs 20 which are interposed between the pressing plate or member and a locking bar 21 located above the body of the mold and extending longitudinally thereof and adjustably connected at its ends with the mold body by means of hook bars 22. The upper pressing plate or cover is oblong and extends the entire length of the mold, and also entirely across the space between the side walls of the mold, and the springs, which are spaced equi-distant from the side walls of the mold and the opposite sides of the center of the mold, urge the pressing plate or cover downwardly and maintain a constant pressure on the meat being molded.

The locking bar 21 is preferably reinforced by a longitudinal rib or flange 23 having annular bosses or enlargements 24 which are countersunk to receive the heads 25 of vertical screws 26. The screws 26 pass through the tubes 19 and have lower threaded ends 27 which are threaded into the upper pressing plate. The locking bar is also provided at its lower face with depending annular bosses 28 which center the upper ends of the coiled springs. The screws limit the separation of the locking bar and the pressing plate and they are adapted to slide in openings 29 in the locking bar to permit the operation of the springs both in the tensioning of the latter and in any upward movement of the pressing plate when pressure is applied to the meat by the adjustable end plate.

Figure 2:
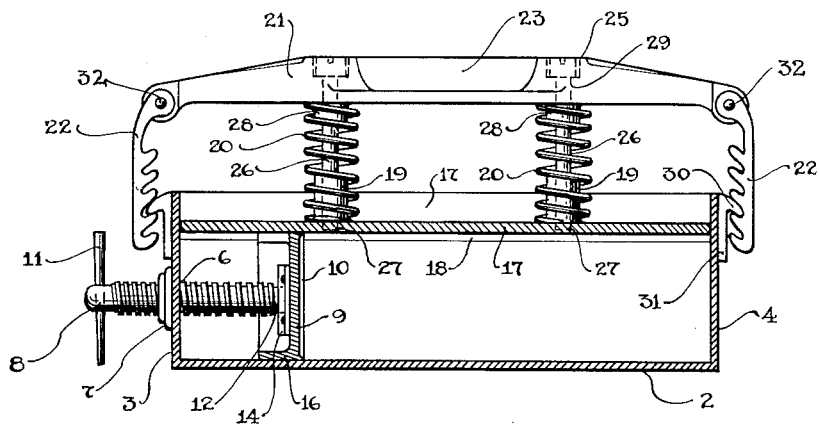
Fig. 2 is a central longitudinal sectional view.
Figure 3:
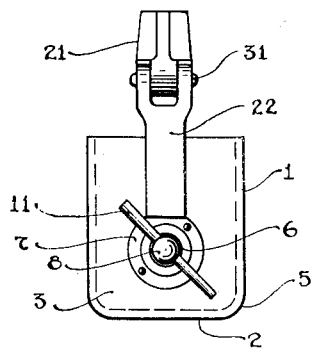
Fig. 3 is an end elevation of the meat mold.
Figure 4:
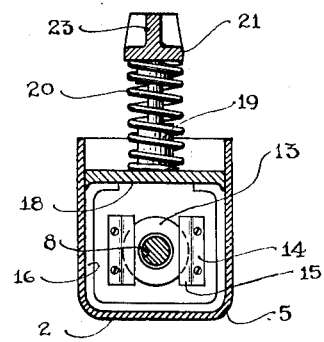
Fig. 4 is a transverse sectional view of the same.

The springs are placed under tension by means of the hook bars 22 which engage lugs 30 of end hooks 31 welded or otherwise secured to the exterior of the end walls 3 and 4 of the mold and located at the top thereof, as clearly shown in Fig. 2 of the drawing. The hook bars are pivoted by suitable pintles 32 to the ends of the locking bar, and are adapted to be readily swung into and out of engagement with the lugs of the end hooks.

Meat previously prepared is placed in the open top form or mold, the inside length of which may be varied by means of the screw operated adjustable end plate 9. The product is pressed into a rectangular shape, first, by applying pressure to the top pressing plate, which presses firmly against the meat and is held secure by means of the springs and the hook bars, and second, by applying end pressure to the meat. The screw is operated and the adjustable end plate is pressed firmly against the end of the meat, creating sufficient pressure to raise, shift, or level the cover or pressing plate and to vary the extreme pressure of the cover on various portions of the ham.

The meat is cooked or chilled in the mold and when cooked or chilled assumes a rectangular shape, the cross section being fixed by the height of the end plate, the pressure of the top plate against the end plate and the meat, and the redistribution of the pressure caused by turning the screw and forcing the end plate inwardly. The height and length are dependent upon the weight of the piece of meat. The cross section of the meat can be controlled and made larger or smaller by increasing and decreasing the vertical dimension and consequent area of the end plate.

The advantage of the top pressing plate in addition to the end pressure is that it keeps and concentrates the grain of the piece of meat in one direction. The adjustable end plate constitutes an adjustable end wall for the mold, and by applying unyielding pressure to the meat by the adjustable end wall, while maintaining a constant yieldable pressure upon the meat by means of the top pressing plate, meat of irregular form, such as hams, is molded into a more uniform square or rectangular shape than heretofore, as the meat adjusts itself under the action of the top pressing plate and the top surface of the meat is substantially flat in the finished product.

What is claimed is:

1. A meat mold of the class described comprising a body open at the top, an adjustable end wall of predetermined area arranged within and movable along the mold to vary the interior length of the same, a top pressing plate constituting a cover for the mold, means for applying a constant yieldable pressure to the top pressing plate, and means operable from the exterior of the mold for applying unyielding pressure to the adjustable end wall.

2. A meat mold of the class described comprising a body open at the top, an adjustable end wall of predetermined area arranged within the body, a top pressing plate constituting a cover for the mold, means for applying yieldable pressure to the top pressing plate, and a screw operable from the exterior of the mold even when the mold is closed, which screw is operatively connected with the adjustable end wall for moving the same to vary the interior length of the mold and also to apply pressure to the meat.

3. A meat mold of the class described comprising a body open at the top, an adjustable end wall of predetermined area arranged within the mold, a top pressing plate arranged within the mold and forming a cover for the same and adapted to rest upon the adjustable end wall, means for applying a constant yieldable pressure against the top pressing plate, and means operable from the exterior of the mold even when the mold is closed for sliding the adjustable end wall along the mold and the lower face of the pressing plate to apply pressure to the meat while the same is yieldably engaged by the pressing plate.

4. A meat mold of the class described comprising a body open at the top, an adjustable end wall of predetermined area arranged within and slidable along the body and provided with a marginal flange forming a relatively broad bearing surface at the top, sides and bottom of the adjustable plate, a top pressing plate constituting a cover for the mold and arranged within the body and resting upon the adjustable end plate, a screw mounted in the mold and extending interiorly and exteriorly thereof and operatively connected to the adjustable end plate, a locking bar located above the mold and adjustably connected at its ends with the same, and springs interposed between the locking bar and the pressing plate and tensioned by the adjustable connections between the locking bar and the body of the mold.

5. A meat mold of the class described comprising a body open at the top and having side, bottom and end walls, an adjustable end plate of predetermined area arranged within the mold and having marginal flanges slidable on the side and bottom walls of the mold, said marginal flange terminating at opposite sides of the center of the top and providing a central opening and side bearing surfaces, a threaded collar mounted on one of the end walls of the mold, a screw extending through and engaged by the said collar and operatively connected at its inner end with the adjustable end of the plate, a top pressing plate forming a cover for the mold and arranged upon the top bearing surfaces of the end plate, a locking bar located above the mold, adjustable means for connecting the locking bar with the mold, and springs interposed between the locking bar and the pressing plate for applying a constant yieldable pressure on the meat while unyielding pressure is being applied to the same by the screw and the end plate.

6. A meat mold of the class described, comprising a body open at the top and having side, bottom and end walls, an adjustable plate arranged within the mold and having marginal flanges slidable on the side and bottom walls of the mold, said marginal flanges terminating at opposite sides of the center of the top and providing a central opening and side bearing surfaces, a threaded collar mounted on one of the end walls of the mold, a screw extending through and engaged by the said collar and provided at its inner end with an annular flange, spaced bearing plates secured to the outer face of the adjustable end plate below the opening in the flange thereof and embracing opposite peripheral portions of the annular flange, a top pressing plate forming a cover for the mold and arranged upon the top bearing surface of the end plate, a locking bar located above the mold, adjustable means for connecting the locking bar with the mold, and springs interposed between the locking bar and the pressing plate and applying a constant yieldable pressure on the meat while unyielding pressure is being applied to the same by the screw and the end plate.

7. A meat mold of the class described including a body having side, bottom and end walls, an adjustable end plate of predetermined area arranged within the mold and having a cup shaped inner face and provided at its outer face with a marginal flange extending around the sides and bottom and partially across the top of the end plate, said flange having its terminals spaced apart at the top of the plate to provide an opening and to form spaced top bearing surfaces, a screw mounted on one of the end walls of the body and operatively connected with the adjustable end plate for moving the same longitudinally of the mold to vary the interior length of the same and to apply pressure to meat, a top pressing plate having a lower cup shaped face and resting upon the top bearing surface of the adjustable end plate, a locking bar extending longitudinally of the mold and adjustably connected at its ends with the same, and springs interposed between the locking bar and the pressing plate.

8. A meat mold of the class described comprising an open top body having a solid bottom portion and integral with the bottom portion, a solid upstanding peripheral wall portion providing fixed end walls and fixed side walls, a vertically movable top pressing plate located within the upstanding peripheral wall portion, which top pressing plate extends the entire length of the mold interior from fixed end wall to fixed end wall and also extends entirely across the space between the fixed side walls, means for applying a constant spring pressure to the top pressing plate in a manner tending to force the top pressing plate towards the bottom portion of the mold, a horizontally positionable adjustable end wall of predetermined area within the mold, which adjustable end wall conforms to the configuration of the interior of the mold, extends across the space between the side walls and is constructed so as to permit forward and rearward movement along the mold to vary the interior length of the same, and means operable from the exterior of the mold for positively moving said adjustable end wall to a horizontally adjusted position and for positively and unyieldingly holding said adjustable end wall in its adjusted position.

MAX BRITT.
MARINUS VANDERKLOOT.